United States Patent [19]

Hunt

[11] 4,275,907
[45] Jun. 30, 1981

[54] QUICK CONNECTABLE COUPLING

[75] Inventor: Alexander C. Hunt, Santa Monica, Calif.

[73] Assignee: Huntal Manufacturing Company Incorporated, Los Angeles, Calif.

[21] Appl. No.: 906,154

[22] Filed: May 16, 1978

Related U.S. Application Data

[63] Continuation-in-part of Ser. No. 729,689, Oct. 5, 1976, abandoned.

[51] Int. Cl.³ .................. F16L 37/28; F16L 35/00
[52] U.S. Cl. ............................ 285/18; 285/319; 285/323; 285/330; 285/423; 251/149.1
[58] Field of Search ............ 285/39, 86, 308, 319, 285/362, 377, 330, 18, 323, 423; 137/329.1, 614.02, 614.04, 614.06, 614.05; 251/149.1, 149.2, 149.3, 149.5, 149.6

[56] References Cited

U.S. PATENT DOCUMENTS

| 1,873,304 | 8/1932 | De Mooy ................ 285/315 X |
| 2,109,344 | 2/1938 | Selger ..................... 285/330 |
| 2,129,704 | 9/1938 | Meyer ................... 285/377 X |
| 2,411,057 | 11/1946 | Robbins ................. 251/149.6 |
| 2,434,167 | 1/1948 | Knoblauch ............. 251/149.6 |
| 2,727,759 | 12/1955 | Elliott .................... 251/149.6 |
| 3,234,965 | 2/1966 | Anderson .................. 285/319 |
| 3,567,175 | 3/1971 | Sciuto, Jr. ............. 251/149.6 |
| 3,569,903 | 3/1971 | Brishka ................. 285/319 X |
| 3,601,361 | 8/1971 | Hundhausen ........... 251/149.1 |
| 4,026,581 | 5/1977 | Pasbrig ................ 285/319 X |

FOREIGN PATENT DOCUMENTS 832228  2/1952  Fed. Rep. of Germany ........ 137/329.1

*Primary Examiner*—William R. Cline

[57] ABSTRACT

A quick connectable manually separable fluid conduit coupling includes a tubular male member having a tapered forward portion including a sealable bearing surface, and a radially inwardly directed shoulder adjacent the rearward part of the forward portion and adjoining a recessed circumference. A female sleeve includes plural stiff, yet resilient, substantially parallel, circumferentially disposed fingers. Radially inwardly extending lips on the fingers have latching surfaces for automatically snapping behind and grasping the shoulder of the male member upon assembly, and further have wedge surfaces radially outwardly movable by axial motion of the tapered forward portion of the male member into the female sleeve during assembly.

10 Claims, 12 Drawing Figures

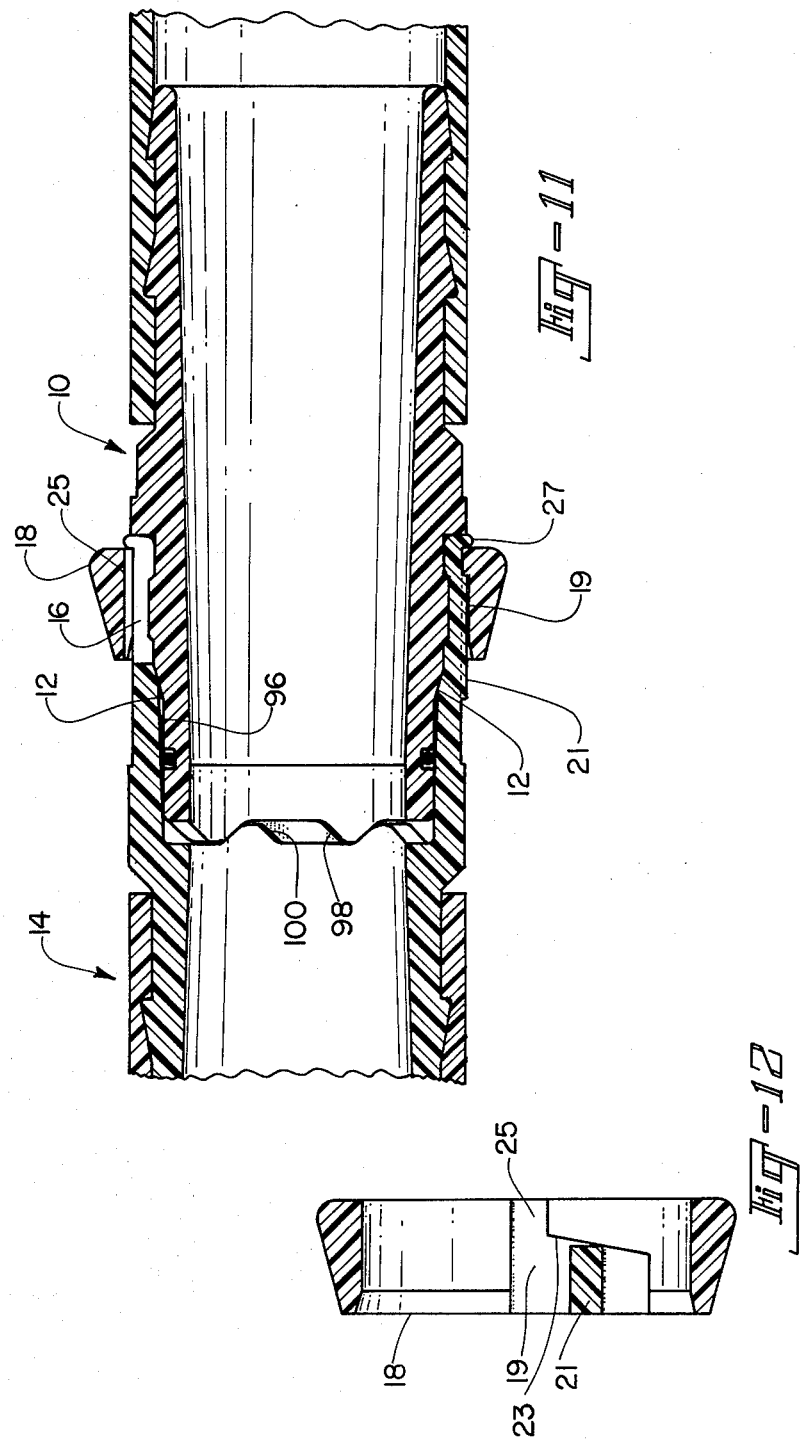

QUICK CONNECTABLE COUPLING

This application is a continuation-in-part of application Ser. No. 729,689, filed Oct. 5, 1976, now abandoned.

This invention relates to fluid carrying conduit couplings and, more particularly, to quick connectable couplings which, where desired, are readily manually separable.

In the art of quick connect and disconnect couplings, a typical type is described, for example, in U.S. Pat. No. 2,784,987 in which latching fingers extending from a female sleeve are normally radially outwardly fixed. This type of coupling requires forced urging of the male member into the packing material (O-ring) in order that the latching projections of the fingers will be positioned over the groove in the male member. With the male and female parts of the coupling thus held in position and the packing material tending to urge them axially apart, it is more than difficult to move the sleeve 41 to a position urging the fingers radially inwardly in the required manner. One person could not effectively handle the necessary simultaneous manipulations.

SUMMARY OF THE PRESENT INVENTION

A quickly manually connectable and separable fluid conduit coupling in accordance with this invention generally comprises a male member having a tapered forward portion including a sealable bearing surface and a radially inwardly directed shoulder adjacent the rearward part of the forward portion and adjoining a recessed circumference. A female sleeve includes a number of stiff, yet resilient, substantially parallel, circumferentially disposed fingers. Radially inwardly extending lips on the fingers have latching surfaces for automatically snapping behind and grasping the shoulder of the male member upon assembly, and further have wedge surfaces radially outwardly movable by axial motion of the tapered forward portion of the male member into the female sleeve during assembly.

In a more specific embodiment, a shut-off valve comprising a disc disposed in the bore of the female sleeve mates with a seat within the bore and prong means extend from the disc to engage the male member. Insertion of the male member into the female sleeve during assembly releases the disc from the seat allowing fluid flow through the coupling.

In another embodiment, the forward portion of the male member is elongated, effectively preventing axial inclination of the male member relative to the female sleeve. The elements may, however, be disconnected by oppositely directed forces along the central axis. In another embodiment, the forward portion of the male member is relatively short, allowing the removal of the male member from the female sleeve by a bending or axis dislocation motion of the male member with respect to the female sleeve.

A further embodiment comprises substantially spherical adjacent surfaces of the sleeve member and assembled male member in order to allow the coupling device to function with the axes thereof dislocated.

A restraining ring may be provided encircling the female sleeve and movable to a forward position adjacent the ends of the fingers to maintain the latching surfaces of the lips locked onto the shoulder on the male member. Where the latching surfaces are angled less than 90° to the axis for self-restraining as hereinafter described, a novel cam operated delatching ring may be employed.

BRIEF DESCRIPTION OF THE DRAWINGS

FIG. 11 is a cross-sectional view of the coupling having variations in structure over FIGS. 1–10; and FIG. 12 is an inside view of the latching means showing the bayonet type slot and key.

DETAILED DESCRIPTION

Figure 1:
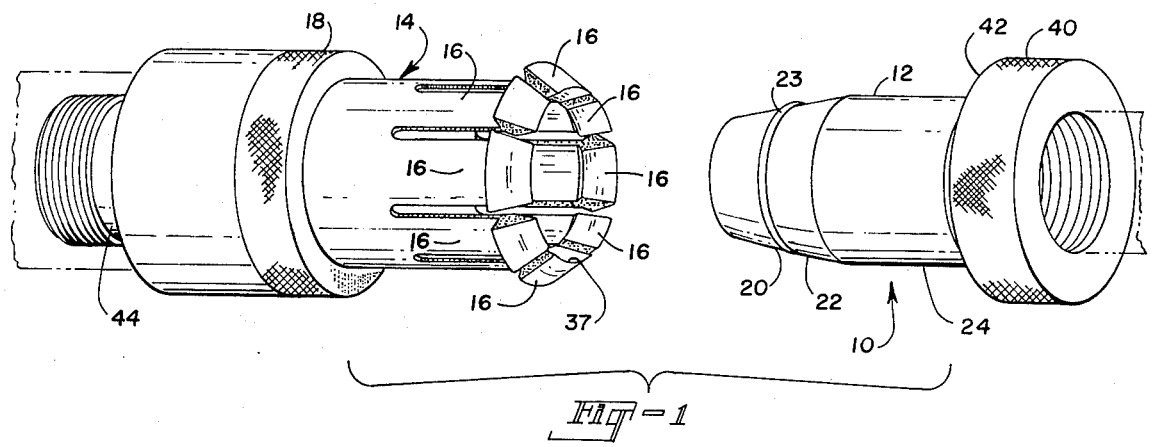
FIG. 1 is an exploded perspective view of a preferred example of a coupling in accordance with this invention joining conduit portions in phantom.

Referring particularly to FIGS. 1, 2, 3, and 4, a quick connectable and manually separable conduit coupling in accordance with this invention includes an integrally molded tubular male member 10 having an elongated tapered forward portion 12 to be retained in an integrally molded and axially apertured female sleeve 14. The sleeve 14 has a plurality of stiff, yet resilient fingers 16 disposed substantially circumferentially about and substantially parallel to an axis passing therethrough. A retaining ring 18 about the sleeve 14 is frictionally slideable to a forward position over the fingers 16 to lock when necessary the fingers 16 in grasping relationship about male member 10 as described below.

The leading end of the forward portion 12 may include a tapered bearing surface 20 of substantial contact area for seating within the female sleeve 14 and positioning the member 10 and sleeve 14 with the bores in communication. Tapering also provides a substantial contact area for the O-ring seal 23 to promote a fluid tight fit. Adjacent the bearing surface 20 is an annular inclined cam surface 22 having a tapered bearing surface 20 for outwardly extending the fingers 16 when the member 10 is inserted into the female sleeve 14. Surface 22 may extend in a gradual taper all the way to its rearward end, or may comprise also a cylindrical guide surface 24 of a suitable length for axially directing the insertion of the forward portion 12 into the female sleeve 14 as shown in the drawings. Should surface 22 be a single taper, a small annular space exists between adjacent portions or surface 22 and sleeve 14.

An annular shoulder 26 on the male member 12 abuts the cylindrical guide surface 24 and extends from the guide surface 24 to a recessed circumference 28. The fingers 16 on the female sleeve 14 have inwardly directed and integral lips 30 at their free ends. A beveled surface 32 may be employed on the shoulder 26 of the male member 10 where it is desired to allow removal and determines in part the required disconnect force of the male member 10 from the female sleeve 14. The beveled surface 32 further aids in transmitting an axially directed force tending to seat the bearing surface 20 within the female sleeve 14 when the coupler is assembled and latched.

The elongated fingers 16 extend forward from the body 15 of sleeve 14 and are sufficiently rigid and resilient for their intended purpose. In this regard, the material from which the coupling is made will largely determine the strength dimensions required. Suitable materials include stainless steel, brass, injection molded high density polyethylene, polypropylene, cellulose esters, polycarbonates, polyurethanes, and the like. Outer surfaces on fingers 16 frictionally engage the inner surface of the encompassing retaining ring 18 and an inner guide surface 34 is registrable about the cylindrical guide surface 24 in the embodiment shown in the drawings. The ring 18 is slideable over the outer surfaces of the fingers 16 to a frictionally held forward location adjacent the lips 30, frictionally maintaining inclined interior latching surfaces 36 in a constraining position against the beveled surface 32 on the shoulder 26. The guide surface 34 slideably receives the cylindrical guide surface 24 of the forward portion 12, to aid axial alignment of the forward portion 12 and to effect proper seating of the bearing surface 20 within the sleeve 14.

Each inclined latching surface 36 mates with the beveled surface 32 of the shoulder 26 such that forces directed radially inward resulting from the resiliency of the fingers 16 tend to axially drive the forward portion 12 toward the female sleeve 14 for seating. The depth of the inwardly directed lips 30 of the fingers 16 is sufficiently shallow to prevent interference from the recessed circumference 28 which is sufficiently recessed to receive the lips 30. Wedge surfaces 37 outwardly disposed on the lips 30 of the fingers 16 are inclined in opposition to the latching surfaces 36, to cause the fingers 16 to expand by wedging against the inclined surface 22 of the insertable male member 10. The ends of the fingers 16 also include limit surfaces 38 extending radially outwardly from the outer guide surfaces to prevent removal of the ring 18 from the sleeve 14.

Figure 2:
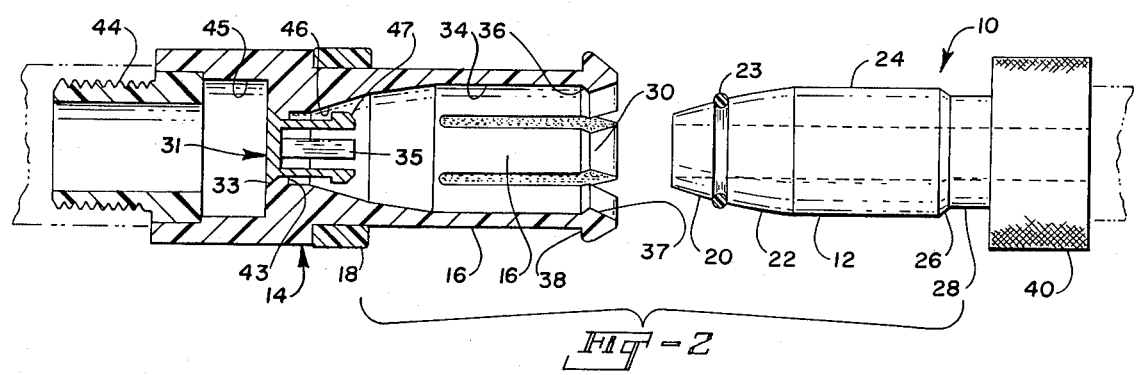
FIG. 2 is a sectional view of the coupling depicted in FIG. 1 shown in a separated position.
Figures 3, 4:
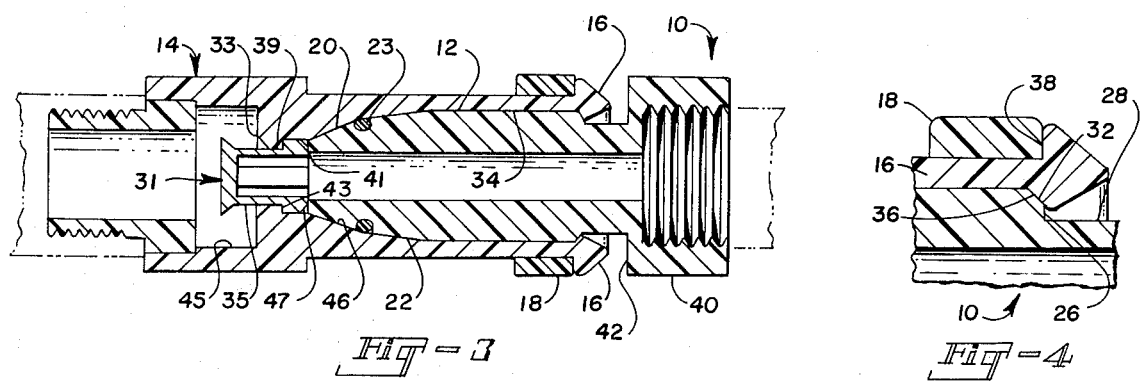
FIG. 3 is a sectional view of the coupling depicted in FIG. 1 shown in a connected position.
FIG. 4 is an enlarged sectional view of a portion of the coupling depicted in FIG. 1 in a connected latching position.
Figures 7, 8, 10:
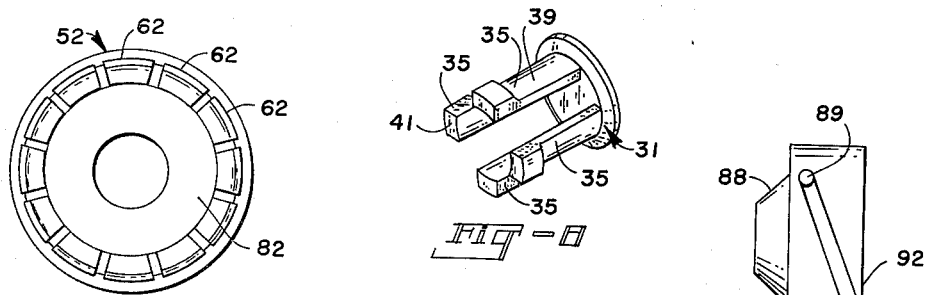
FIG. 7 is an end view of the female sleeve of the coupling depicted in FIG. 5.
FIG. 8 is a perspective view of the valve element shown in FIG. 2.
FIG. 10 is a reduced scale elevation of the delatching ring showing a cam slot and pin type of actuator.

A shut-off valve depicted in FIG. 8, disposed within the female sleeve 14 comprises a beveled disc 31 normal to the axis of the sleeve 14. The disc may have a small O-ring, not shown, about its inclined beveled surface. The disc 31 mates with a beveled seat 33 within and normal to the sleeve axis and flared in opposition to the bearing surface taper. The disc 31 may have a curved back surface to reduce turbulent flow. Prongs 35 extending from the disc 31 ride along a narrow inner cylindrical surface 39 and have end surfaces 41 for bearing on the end of the male member 10. Outwardly directed nibs extending from the prongs 35 bear on an annular ledge surface 43 to prevent removal of the valve element from the female sleeve 14. Yet the prong means may be easily compressed for initial snap-in assembly in the female sleeve. In the embodiment of FIGS. 2 and 3, the leading outer edges 47 are beveled to allow the valve to be assembled by pushing it through its seat and allowing the prongs 35 to snap back into locking position. An enlarged chamber 45 adjacent beveled seat permits substantial fluid flow despite flow impediment from the disc 31.

Fluid pressure from the female sleeve 14 forces the beveled disc 31 to mate with the beveled seat 33, closing the sleeve opening and preventing escape of fluid. As the male member 10 is inserted in the female sleeve 14, the end of the male member bears on the end surfaces 41 of the prongs 35. The disc 31 is then pushed back within the sleeve 14 allowing release of fluid, the flow extending through the chamber 45 about the space between the disc and the inner diameter of the female sleeve and between the prongs 35.

The male member 10 includes a cylindrical conduit connecting portion 40 extending back from the forward portion and including a shoulder facing surface 42. To avoid interference from the terminal lips 30 of the female sleeve 14, the facing surface 42 is spaced apart from the shoulder 26. The connecting portion 40 has a knurled manually grippable cylindrical surface and an internal thread for connection to threaded conduit such as a water line. The female sleeve 14 includes an externally threaded connecting portion 44 for attachment to an internally threaded conduit terminal. For purposes of fabrication where the valve is used, the threaded connecting portion 44 may be a separate molded piece fixed within the sleeve 14 adjacent the enlarged chamber 45.

The female sleeve 14 also includes an interior annular mating and bore aligning surface 46 tapering inwardly from the ends of the fingers 16 toward the sleeve axis. Tapering provides a wide surface contact area to promote aligning and sealing to the bearing surface 20. An O-ring or other type seal 23 is seated in a circumferential notch preferably on the male member but operable also on the female sleeve preferably at the junction of surfaces 20 and 22. Though the substantial area of the bearing surface 20 is generally sufficient to provide a fluid tight seal, an O-ring provides added assurance of sealing in certain applications. It is noted that in all of the embodiments disclosed herein, surfaces 46 and 20 must be so positioned on their respective members, that their contacting will not interfere with the latching movement of lips 30 relative to shoulder 26 or with the sealing by 23. The length of the forward portion from its end to the shoulder 26 is greater than the inner diameter of the sleeve 14 defined by the inner guide surfaces. This limits bending of the male portion 12 in the female sleeve 14, should the coupling encounter side loading, i.e., being dropped.

In use, quick positive coupling may be achieved by inserting the bearing surface 20 of the male member 10 between the fingers 16 of the female sleeve 14. The inclined surface 22 of the male member 10 smooth and easily expands the fingers 16 outwardly. As an axial force between the male member 10 and the female sleeve 14 is applied the inwardly directed lips 30 of the fingers 16 ride along the forward portion 12. The bearing surface 20 being axially guided in alignment approaches the mating surface 46 of the female sleeve 14 as the latching surfaces 32 of the fingers 16 extend over the shoulder 26. Radially inward directed forces of the resilient fingers 16 and the inclined latching surfaces 36 against the beveled surface 32 of the shoulders, tend to further move the male member 10 toward the female sleeve 14 causing the bearing surface 20 to snugly seat in the mating surface 46 of the female sleeve 14.

When the male member 10 is latched to the female sleeve 14, relatively large surface contact area between the bearing surface 20 of the male member 10 and the mating surface of the female sleeve 14 assures a substantial fluid seal even if an O-ring were not used. The ring 18 is then moved forward to fully secure the latching surfaces of the fingers 16 to the beveled shoulder 32 of the male member. Additionally, the ring 18 causes the latching surfaces 36 of the fingers 16 to exert forces radially inward against the beveled shoulder 26 of the male member 10 tending to firmly seat the bearing surface 20 of the male member 10 in the female sleeve 14. The male member 10 then becomes inseparable from the female sleeve 14. Yet a simple retraction of the ring 18 followed by an axial movement of the male member 10 with respect to the female sleeve 14 releases the male member 10 from the female sleeve 14. The male member 10, female sleeve 14 and ring 18 are all easily and inexpensively molded and fabricated, providing a readily connectable and disconnectable coupling.

The present invention also contemplates that the inner surfaces of the sleeve member such as 34 and 46 and the outer surfaces 20, 22, and 24 of member 10 be contoured in a substantially spherical manner such that relative rotation of the members may be made out of axial alignment to accommodate certain installations. In such a case, the lips 30 are located further radially outward than shown in order to allow the dislocation of the axes. Likewise, in such a case, it is desirable to widen one or both of the bores of the members adjacent the junction thereof. In this embodiment the curvature of male member provides the shoulder which the lips 30 engage.

Figure 5:
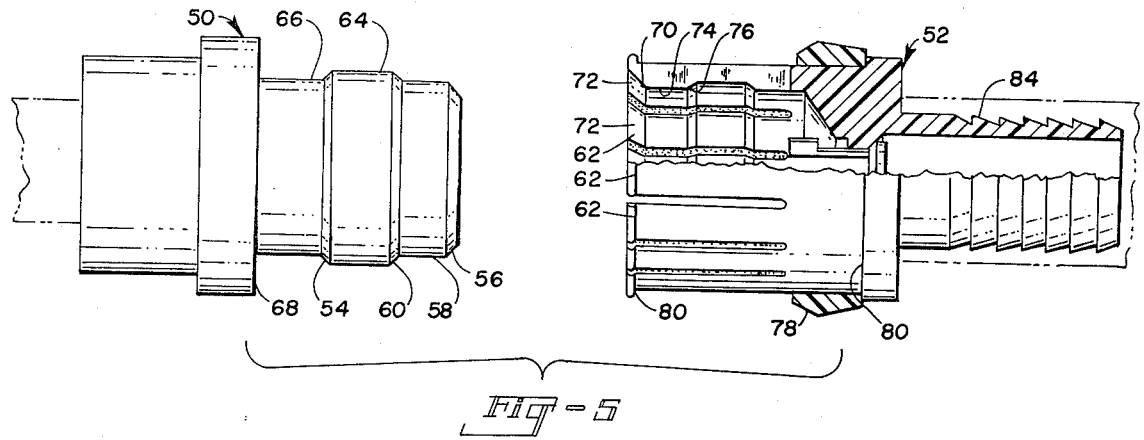
FIG. 5 is an exploded plan view with portions exposed and portions removed of a different example of a coupling in accordance with this invention.
Figure 6:
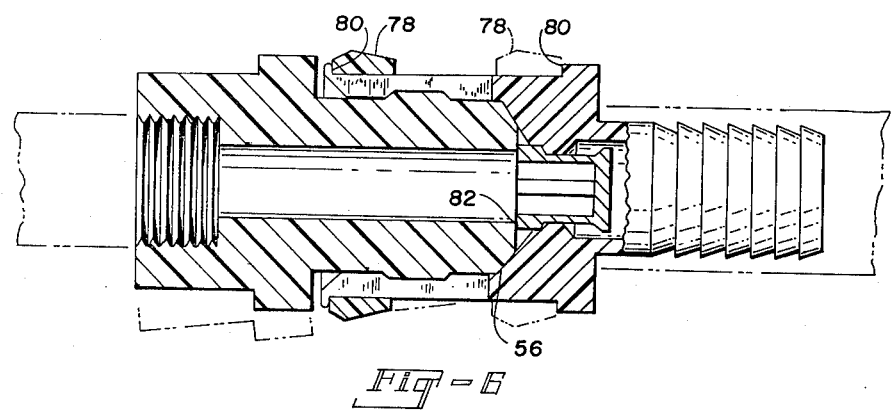
FIG. 6 is a sectional view of the coupling depicted in FIG. 5 shown in a connected position.

Referring particularly to FIGS. 5, 6, and 7, a different embodiment of the invention is provided in which the quick connectable coupling may be disconnected by a bending motion. Whereas in the previous example, the forward portion 12 of the male member 10 is relatively long with respect to the inner sleeve diameter, here the forward portion is shorter than the sleeve inner diameter.

The connector comprises a male member 50 connectable to a female sleeve 52. The male member 50 including a forward portion extending from an end to a beveled shoulder 54 has a narrow tapered bearing surface 56 for providing a sealing fit within the female sleeve 52. A narrow cylindrical guide surface 58 adjacent the bearing surface 56 abuts an outwardly tapered surface 60 for extending fingers 62 of the female sleeve 52. A cylindrical surface 64 adjacent the tapered surface 60 guides the forward portion into the female sleeve 52. The surface 64 mates with inner guide surfaces of the fingers 62 to firmly align the forward portion in the female sleeve. Adjacent the cylindrical surface 64 the shoulder 54 tapers inwardly to a recessed circumference 66. A back surface 68 is spaced apart from the shoulder 54 to prevent interference from inwardly directed lips 70 at the ends of the fingers 62.

The lips 70 have wedge surfaces 72 for coacting with the surface 60 of the forward portion. Adjacent the wedge surfaces 72 of the fingers 62 are guide surfaces 74 generally parallel to the axis of the sleeve 52. Inclined latching surfaces 76 extend inwardly from the guide surfaces 74.

The wedge surfaces 72 of the fingers 62 are spaced apart from the inclined latching surfaces 76 by the guide surface 74. The resilient forces of the fingers 62 acting on the forward portion are effectively greater having a shorter lever arm when the forward portion is attempted to be pulled axially apart from the female sleeve 52, than when the male member 50 is axially inserted therein. Thus, greater mechanical and flexural advantage is provided when an inserting force acts on the wedge surfaces than when a removal force acts on the latching surfaces. This results in a forward portion which is easily connectable but requires substantial axial outward force to remove. However, the coupling may be readily separated by bending the male member (as shown in phantom in FIG. 6) while in the female sleeve 52 to outwardly extend the adjacent fingers 62 allowing removal of the male member 50 from the sleeve 52.

A ring 78 encircles the sleeve 52 and is movable between limit surfaces 80 on the body of the sleeve 52. In a frictionally held forward position, the ring 78 constrains the fingers 62 to maintain the latching surfaces 76 over the shoulder 54.

In the constraining position the bearing surface 56 seats in a mating surface 82. As viewed in FIG. 7, the mating surface has a substantial area to receive the bearing surface 56, though matched areas may be preferable under moderate pressures to avoid turbulence.

An annular serrated ridge connector 84 is shown extending from the female sleeve 52.

A longitudinal keyway indentation (not shown) within the sleeve and a mating ridge (not shown) on the forward portion of the male member may be used for orienting the male member with respect to the female sleeve in one position.

Figure 9:
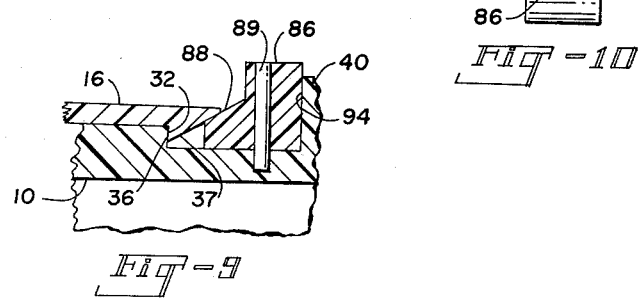
FIG. 9 is a cross-sectional view of the delatching ring applied to the aforesaid couplers.

Referring to FIGS. 9 and 10, a positive automatic finger latching embodiment is shown which can be used with any of the aforedescribed couplers. Numbering this embodiment for convenience according to FIGS. 1–4, the delatching ring 86 encircling the male member has a cam 88 which is urged under wedge surfaces 37 of the lips 30 to disengage latching surfaces 36 from the undercut surface 32 as ring 86 is simply rotated to translate cam slot 90 with respect to a pin 89 which is secured in member 10. As many pins 89 and slots 90 as necessary for ease of action may be employed around ring 86. Also, the cam surfaces may be formed on adjacent surfaces 92 and 94 of ring 86 and connecting portion 40. It is noted, however, that the pin and slot arrangement provides a means to retaining ring 86 on member 10.

In this embodiment of the finger lip configuration, surface 32 of shoulder 26 and surfaces 36 of lips 30 are undercut a suitable angle to lock the members together without the need for retaining ring 18. It is particularly noted that a significant improvement in assembly of the coupling may be attained with all of the embodiments shown by the placement of the seal 23 on the tapered portion of the member. Such placement exerts tremendous sealing pressure on the O-ring without attendant axial thrust tending to delatch the male and female members. A slight space between surfaces 92 and 94 may be provided to allow full seating of surfaces 32 and 36.

Referring to FIGS. 11 and 12, the female member 14 may be tapered at 96 while the male member 10 is straight. This provides for a very tight seal made by progressive insertion of the male member. The members are preferably provided with cam surfaces 98 and 100 which effectively disconnect the fingers by opposite rotation of the members after ring 18 is retracted. Ring 18 may be provided with a bayonet type slot 19 in its inner surface for cooperation with a key 21 projecting outwardly from the surface of the female member such as one or more fingers 16 to lock ring 18 in locking position. A tapered surface 23 may be provided such that rotation of the ring after key 21 has passed through portion 25 of the slot will tend to cam the ring toward lips 27 on the fingers in a tightening manner.

The male members and female sleeves may also be molded from inexpensive thermoplastic material such as ABS polymer resins or materials such as Nylon or Delrin. The small number of elements, fabrication from low cost materials and convenience in connection and disconnection provides a very advantageous conduit coupling device.

While the invention has been particularly shown and described with reference to preferred examples thereof, it will be understood by those skilled in the art that various changes in form and details may be made herein without departing from the spirit and scope of the invention.

I claim:

1. A coupling device for fluid conduits comprising a tubular male member and a female sleeve member adapted for connection to conduits, said male member having tapered means on its outer surface radially expanding along a generally longitudinal axis thereof, and shoulder means adjacent the rearward portion of said outer surface and extending radially inwardly therefrom, said members having means for positioning the same with the bores thereof in communication, resilient latching means on said female sleeve member adapted to be flexed radially outwardly by said tapered means and comprising radially inwardly directed lip means which snap behind said shoulder means when said members are positioned, at least one of said shoulder means and lip means making an obtuse angle with the longitudinal axis of its associated member such that axially directed pulling force will flex said resilient means of said female sleeve member outwardly to disengage said lip and shoulder means, locking ring means positioned around the outer surface of said female sleeve member and movable axially thereof by manual force into and out of a position maintaining said latching means in locking relationship to said shoulder means, and cooperating cam means on said male member and said female sleeve member whereby opposite rotation of said members relative to each other causes said cam means to axially displace said members and comprising cooperating slanted ramps formed on the inner end of said male member and on a contiguous portion of the inner surface of the bore of said female member.

2. The device of claim 1 wherein said resilient means comprises a plurality of circumferentially spaced fingers extending generally axially.

3. The device of claim 2 wherein a circumferential sealing surface is provided on the bore wall of said female member, and a cooperating circumferential sealing surface is provided on the outer wall of said male member, said sealing surfaces being adapted to contact each other when said members are assembled and provide a fluid tight seal therebetween.

4. The device of claim 3 wherein at least one of said sealing surfaces has a taper relative to the axis for generating magnified sealing pressure as said members are axially assembled.

5. The device of claim 4 wherein at least one of said sealing surfaces is an O-ring.

6. The device of claim 2, in which the fingers have inner guide surfaces defining an inner diameter of the female sleeve, the forward portion of the male member defining a length extending to the shoulder, the length being greater than the female sleeve inner diameter to limit bending of the male member between the fingers and guide the male member axially towards the female sleeve.

7. The device of claim 1 wherein a leading circumferential portion on said tubular male member is essentially non-tapered, an annular seal is carried in a circumferential groove in said leading portion of said male member and is adapted to sealingly engage a leading inner peripheral portion of said female sleeve member.

8. The device of claim 7 wherein said inner peripheral portion of said female sleeve member is longitudinally tapered.

9. The device of claim 1 wherein the inner surface of said ring and the outer surface of said female sleeve member contiguous therewith are provided with a bayonet type slot and key, each extending generally axially of said ring and sleeve member with the locking portion thereof extending generally transversely of said axis such that said ring may be rotated on said sleeve member to lock it against axial movement.

10. The device of claim 9 wherein the forward portion of said resilient latching means is provided with a radially outwardly extending lip, and said slot is provided with an angled surface for contacting said key such that said rotation will urge said ring axially toward said lip.

* * * * *